(12) United States Patent
Ronchi et al.

(10) Patent No.: US 12,234,872 B2
(45) Date of Patent: Feb. 25, 2025

(54) BRAKING BAND OF A DISC FOR DISC BRAKE OF VENTILATED TYPE

(71) Applicant: Brembo S.p.A., Bergamo (IT)

(72) Inventors: Nino Ronchi, Bergamo (IT); Paolo Donati, Bergamo (IT)

(73) Assignee: Brembo S.p.A., Bergamo (IT)

( * ) Notice: Subject to any disclaimer, the term of this patent is extended or adjusted under 35 U.S.C. 154(b) by 340 days.

(21) Appl. No.: 17/754,388

(22) PCT Filed: Oct. 2, 2020

(86) PCT No.: PCT/IB2020/059253
§ 371 (c)(1),
(2) Date: Mar. 31, 2022

(87) PCT Pub. No.: WO2021/064666
PCT Pub. Date: Apr. 8, 2021

(65) Prior Publication Data
US 2022/0364616 A1    Nov. 17, 2022

(30) Foreign Application Priority Data

Oct. 2, 2019    (IT) .................... 102019000017696

(51) Int. Cl.
| | | |
|---|---|---|
| *F16D 65/12* | (2006.01) | |
| *F16D 65/00* | (2006.01) | |
| *F16D 65/02* | (2006.01) | |

(52) U.S. Cl.
CPC ....... *F16D 65/128* (2013.01); *F16D 65/0006* (2013.01); *F16D 65/123* (2013.01);
(Continued)

(58) Field of Classification Search
CPC ................................................... F16D 65/128
See application file for complete search history.

(56) References Cited

U.S. PATENT DOCUMENTS

| | | |
|---|---|---|
| 3,983,973 A | 10/1976 | Zboralski et al. |
| 4,523,666 A | 6/1985 | Murray |

(Continued)

FOREIGN PATENT DOCUMENTS

| | | | | |
|---|---|---|---|---|
| CN | 107202085 A | * | 9/2017 | |
| CN | 108458011 A | * | 8/2018 | ........... F16D 65/125 |

(Continued)

OTHER PUBLICATIONS

European Patent Office, International Search Report and Written Opinion in Application No. PCT/IB2020/059253, dated Jan. 21, 2021, 12 pages, Rijswijk Netherlands.

*Primary Examiner* — Melody M Burch
(74) *Attorney, Agent, or Firm* — Marshall & Melhorn, LLC

(57) ABSTRACT

A braking band of a disc brake disc of a ventilated type unusually capable of avoiding vibrations which induce annoying squeals during the braking action. The braking band having two plates joined by connecting elements. At least one of the connecting elements is a fin that has an extension along an outer circumferential width, and an extension along an inner circumferential width. A section taken along a section plane having a radial and circumferential direction, section made by passing through a mean air flow point which runs through a gap, where the outer circumferential width is greater than the inner circumferential width.

12 Claims, 12 Drawing Sheets

(52) U.S. Cl.
CPC ............... *F16D 2065/1328* (2013.01); *F16D 2065/1392* (2013.01)

(56) References Cited

U.S. PATENT DOCUMENTS

| | | |
|---|---|---|
| 4,865,167 A | 9/1989 | Giorgetti et al. |
| 4,867,284 A | 9/1989 | Okamura et al. |
| 5,004,078 A | 4/1991 | Oono et al. |
| 5,542,503 A | 8/1996 | Dunn et al. |
| 6,131,707 A | 10/2000 | Buechel et al. |
| 6,145,636 A | 11/2000 | Ikari et al. |
| 6,325,185 B1 | 12/2001 | Doi et al. |
| 6,367,599 B2 | 4/2002 | Kobayashi |
| 7,066,306 B2 | 6/2006 | Gavin |
| 7,267,210 B2 | 9/2007 | Cornolti et al. |
| 2004/0118644 A1 | 6/2004 | Oberti et al. |
| 2004/0124047 A1 | 7/2004 | Oberti et al. |
| 2006/0219500 A1 | 10/2006 | Lu et al. |
| 2006/0243546 A1 | 11/2006 | Oberti et al. |
| 2009/0000884 A1 | 1/2009 | Layton et al. |
| 2009/0035598 A1 | 2/2009 | Hanna et al. |
| 2010/0122880 A1 | 5/2010 | Hanna et al. |
| 2012/0111692 A1 | 5/2012 | Chern et al. |
| 2018/0163802 A1* | 6/2018 | Boffelli ................. F16D 65/128 |
| 2020/0132146 A1* | 4/2020 | Zhang ................... F16D 65/124 |

FOREIGN PATENT DOCUMENTS

| | | | |
|---|---|---|---|
| CN | 108561460 A * | 9/2018 | ........... F16D 65/123 |
| DE | 102004056645 A1 | 6/2006 | |
| DE | 202006017092 U1 | 1/2007 | |
| DE | 102013210700 A1 | 12/2014 | |
| DE | 102013225538 A1 | 6/2015 | |
| DE | 202015102580 U1 | 9/2015 | |
| EP | 0318687 A2 | 6/1989 | |
| EP | 0903513 A2 | 3/1999 | |
| EP | 1433973 A1 | 6/2004 | |
| EP | 1373751 B1 | 2/2007 | |
| EP | 2192321 A1 | 6/2010 | |
| EP | 2715179 B1 | 1/2015 | |
| EP | 3421833 A1 | 1/2019 | |
| GB | 2060796 A | 5/1981 | |
| GB | 2076090 A | 11/1981 | |
| GB | 2286438 A | 8/1995 | |
| IT | 1273754 B | 7/1997 | |
| JP | 4509599 B2 | 7/2010 | |
| SI | 123471 A | 3/2012 | |
| WO | WO-2006067816 A1 * | 6/2006 | ......... F16D 65/0006 |

\* cited by examiner

BRAKING BAND OF A DISC FOR DISC BRAKE OF VENTILATED TYPE

FIELD

The present invention relates to a braking band, a ventilated disc for disc brake, particularly, but not exclusively, for applications in the automobile field, and a vehicle having said ventilated disc.

BACKGROUND

In a disc brake, the brake caliper is generally arranged straddling the outer peripheral margin of a brake disc, adapted to rotate about a rotation axis (A-A) defining an axial direction (X-X). In a brake disc, a radial direction (R-R) is further defined, substantially orthogonal to said axial direction (X-X), and a circumferential direction (C-C), orthogonal to said axial direction (X-X), to said radial direction (R-R) and locally a tangential direction (T-T), or rather punctually, i.e. in intersection points of an axial and radial direction, orthogonal to said axial direction (X-X) and said a radial direction (R-R).

As known, discs for disc brake comprise a bell adapted to associate the disc with a hub of a vehicle, from which an annular portion, named a braking band, which is intended to cooperate with brake pads of a caliper, extends. In the case of discs of ventilated type, the braking band is made by means of two plates facing and connected to each other by means of connecting elements, respectively, e.g. in the shape of pins or fins. The outer surfaces of the two plates define opposite braking surfaces, while the inner surfaces, together with the pins or fins, delimit ventilation channels for cooling the disc, which channels are crossed by airflows according to a centrifugal direction during the rotary motion of the disc itself.

Said braking band is intended to cooperate with disc brake calipers adapted to apply a braking action on the vehicle by applying, by means of the aforesaid pads, friction on opposite surfaces of the two plates, named braking surfaces.

It is known that during the operation of the brakes, the friction between the pads of the brake calipers and the braking surfaces of the braking band generates a high amount of heat which requires disposal.

The heat generated indeed causes several undesired phenomena, such as, for example, the deformation of the braking band, the formation of cracks on the braking surfaces or localized transformations of state of the material forming the braking band, which result in the deterioration of the braking band itself, in turn.

In applications on high-performance motor vehicles with an increased braking efficiency, in particular, there is much energy to be disposed of, and the aforesaid need to dispose of the heat generated during the braking action is even more felt.

Ventilated discs of the type mentioned above have undergone a continuous evolution over time, in particular concerning the number and shape of the so-called ventilation channels, thus defining the gap which is formed by the two plates axially facing each other.

Among said known ventilated discs, the so-called "pin discs" have shown to be particularly efficient in terms of heat disposal performance, i.e. cooling in which discs the ventilation channels are limited internally by particular column connecting elements, having limited or substantially slightly different comparable radial and circumferential extension with respect to the axial extension thereof, definable as "pins" which transversely connect the two plates.

For example, ventilated "pin discs" are known from EP 1 373 751 B1, in which the pins geometrically are arranged along three concentric circumferences which are coaxial to the disc and of a different radius, to form three "ranks"; if cross-sectioned on a plane parallel to the two plates and median with respect thereto, the pins have different types of cross sections (e.g. "rhomboidal" cross-section pins in the intermediate and outer ranks; "drop-shaped" pins in the outer rank).

Other ventilated discs with "pin" structures are known, for example, from WO 2004/102028 and U.S. Pat. No. 5,542,503.

The so-called "fin" or "wing" discs are known among ventilated discs, in which the ventilation channels are limited internally by particular connecting elements elongated along a prevalent direction, e.g. directed according to a direction parallel to the radial direction (R-R), or spiral-like which transversely connect the two plates It is also known that the braking action provided by the pads against the braking surfaces of the disc generates heat, consequently an increase of temperature of the disc to the extent of making the disc itself incandescent in the case of particularly demanding performance. The disc is deformed and the contact between the pads and the braking surfaces deteriorates due to the increased temperature reached by the disc during the braking. Furthermore, the friction material of the pads undergoes a kind of vitrification and pollution by the disc material.

It has further been found that the higher temperature is reached at a middle annular portion of the braking surfaces, i.e. at a middle annular portion of the outer surfaces of the respective plates. Such a zone is easily subject to the formation of cracks over the course of the life of the disc.

To obviate the above-disclosed drawbacks, the need is particularly felt in the field, on the one hand, to increase the dispersion efficiency of the heat generated by the braking to contain the temperatures reached by the disc during and following the braking, and the need, on the other hand, to increase the mechanical resistance of these middle portions of the braking band.

Solutions are disclosed in WO 2004/102028 and also in WO 2002/064992, U.S. Pat. Nos. 7,066,306, 7,267,210, US2006 0243546, US 2004 0124047, U.S. Pat. Nos. 6,367, 599, 5,542,503 and 4,865,167. Although satisfactory from various points of view, these known solutions do not allow to achieve a compromise between the desired mechanical resistance in the middle annular zone of the braking band and the contrasting need to maximize, in the same zone, the air flow capable of removing the significant localized increase of temperature caused by the braking action.

However, it is worth noting that ventilated discs of the type mentioned do not in themselves provide a solution to a further problem which may affect the disc brakes, in particular, disc brakes with ventilated discs, arising simultaneously to the problem mentioned above and which is to be resolved at the same time. The problem is briefly described hereinbelow.

As known, during the operation of the brakes, the disc and the braking bands, in particular, may mechanically vibrate at correlated various frequencies at the various natural vibration modes of the disc itself. Such disc vibrations may result, for example, from resonances triggered by vibrations of objects mechanically coupled to the disc which are biased in the step of braking should the vibration frequencies of such objects be coincident with or sufficiently close to the natural vibration frequencies of the disc.

It is also known that the aforesaid vibrations cause an audible noise, in particular in the form of annoying squeals when the resonance frequencies are in the audible range (e.g. between 2 and 9 kHz, with subsequent more or less shrill squeals).

Consequently, the need arises to devise solutions to reduce or eliminate such squeals by means of constructive measures which "shift" the vibration frequencies of the disc to values other than the excited ones.

Some solutions are known for discs with different structures from aforesaid "pin" structures.

For example, IT 1 273 754 has braking bands with projections protruding into the inner part of the plates, towards the gap between the two plates, in particular positions and with masses which were specifically identified to reduce the arising vibrations and the subsequent noise.

Other ventilated discs with structures adapted to reduce annoying vibrating phenomena are known, e.g. from U.S. Pat. No. 4,523,666.

Document U.S. Pat. No. 3,983,973 by Knorr-Bremse GmbH shows a brake disc comprising a pair of friction plates spaced apart from each other to form a ventilation channel. A braking force may be applied against said plates by means of a braking lining of brake pads. The two plates are interconnected by a plurality of flow guide ribs or fins to define ventilation passages between the friction plates. Strips of anti-vibrating material are positioned in radial grooves formed in the mutually facing surfaces of the friction plates. These inserts consist of metal elements, which damp the vibrations and have a greater expansion coefficient than that of the ferrous material with which the friction plates are made, such as lead, bronze, or copper.

A similar solution is known from US2009035598.

It is known from document US2012111692 to couple passive dampers of the Squawk type with the braking device to reduce the vibrations.

Other solutions showing ventilated braked bands connected by fins are known from WO2006067816, GB2076090, U.S. Pat. No. 4,867,284.

From solutions U.S. Pat. No. 6,131,707, WO2016020820, WO2017153902, WO2017153873, EP0318687, WO2011058594, WO2006105131, US2006219500, U.S. Pat. No. 6,145,636, US2010122880, U.S. Pat. Nos. 6,325,185, 4,523,666, 5,004,078, SI23474, GB2060796, DE102013210700, EP3421833, WO2015092671, GB2286438, DE102004056645, EP2192321, WO2008078352, U.S. Pat. No. 3,983,973, DE202006017092, US20090000884, DE202015102580, EP3084256, EP2507108, EP2276946, EP2145119, EP2100051, WO200792116, WO2004102028, EP1433973 it is known to provide connections between the braking band plates circumferentially distributed in non-uniform manner to reduce the natural vibrations excited by the braking action and increase the ventilation in the gap.

However, these distributions of the connecting elements of the plates, create structural unevenness capable, in some situations of the braking action, of generating entirely unwanted stress concentrated in the braking band.

Therefore, the need has arisen for new ventilated disc structures which concurrently offer both particularly efficient cooling performance and properties of minimizing vibrations and noise in the step of braking, and while avoiding to cause concentrated stresses in the braking band which could compromise the integrity and duration thereof.

The aforesaid known examples of ventilated discs and respective braking bands are not capable of adequately meeting all the strongly desired requirements mentioned.

Document EP 2 715 179 B1 by the same Applicant, partly solves these problems and in particular aims at reducing the natural frequencies of the vibration modes of the braking band which involve vibrations outside the plane of the plates of the band itself. In particular, this solution has shaped pins, which protrude into the gap between connecting elements.

This known solution, although satisfactory from many points of view, does not completely solve the problem and, in particular has highlighted the need to find solutions, which allow to easily create the shape of the surfaces which delimit the gap between the braking band.

Therefore, the need is still strongly felt to increase the mass of the braking band near its outer edge, to reduce the natural vibration modes of the braking band of the out of plane type, which, when excited, have a very negative effect on brake performance.

In particular, the need is felt to devise a shape of the connecting elements of the braking band plates which allows to reduce the amplitude of the most annoying natural vibration modes of the braking band, particularly in the sense of their specific frequency.

SUMMARY

Therefore, the problem underlying the present invention is to provide a braking band and a disc for brake disc, which have structural and functional features such to satisfy the aforementioned requirements and, at the same time, solve the drawbacks mentioned with reference to the prior art and satisfy the aforesaid felt needs.

It is the object of the present invention to provide a braking device in which the tendency to create these vibratory waves and consequent squeals, is reduced.

This and other purposes and advantages are achieved by a braking band, a disc brake disc and a vehicle according to the claims.

Some advantageous embodiments are the object of the dependent claims.

From the analysis of this solution, it has emerged how the suggested solution allows a much superior braking comfort to be achieved with respect to solutions of the prior art, therefore a reduction of the vibrations, and in particular an absence of vibrations resulting in squeals.

Moreover, the suggested solution maintains a disc cooling efficiency which is very high and even improved in some embodiments; for example, the efficiency is greatly improved by virtue of the increased air flow turbulence through the gap of the braking band, turbulence which is determined by the specific shape of the fins associated with shaped pins present between the plate.

Furthermore, the suggested solutions allow to increase the mass of the braking band and stiffen radial portions of the braking band thus breaking the circular symmetry of the distribution of the pins with fins extended over the entire radial height of the band, in particular increasing the mass near the radially outer edge of the braking band, to reduce the natural vibration modes of the braking band of the out of plane type which very negatively affect the performance of the brake when excited.

Furthermore, by virtue of the suggested solutions, it is possible to guarantee greater mass between the shaped pins by virtue of the enlarged fins in their radially outer portion, above all near the outer edge of the disc, thereby simplifying the production process.

Furthermore, by virtue of the suggested solutions, it is possible to avoid a large annular area of the hollow gap empty from connecting elements or shaped pins, thus avoiding a poor temperature distribution on the braking band, such as to generate a vibration of the disc or another imbalance phenomenon.

Furthermore, by virtue of the suggested solutions, it is possible to increase the mass close to the outer edge avoiding the occlusion or excessive restriction of the ventilation channel and, at the same time, structurally strengthening the band to limit the formation and propagation of cracks.

Furthermore, by virtue of the suggested solutions, it is possible to guarantee an increase in thermal breakage resistance.

Furthermore, by virtue of the suggested solutions, it is possible to guarantee shaped pins and elongated and enlarged fins in their radially outer portion able to further increase the surface area available for the heat exchange

DESCRIPTION OF THE FIGURES

Further features and advantages of the device, of the brake disc and of the vehicle will be apparent from the following description of preferred embodiments thereof, by way of non-limiting examples, with reference to the accompanying figures, in which.

DETAILED DESCRIPTION

Figure 1:
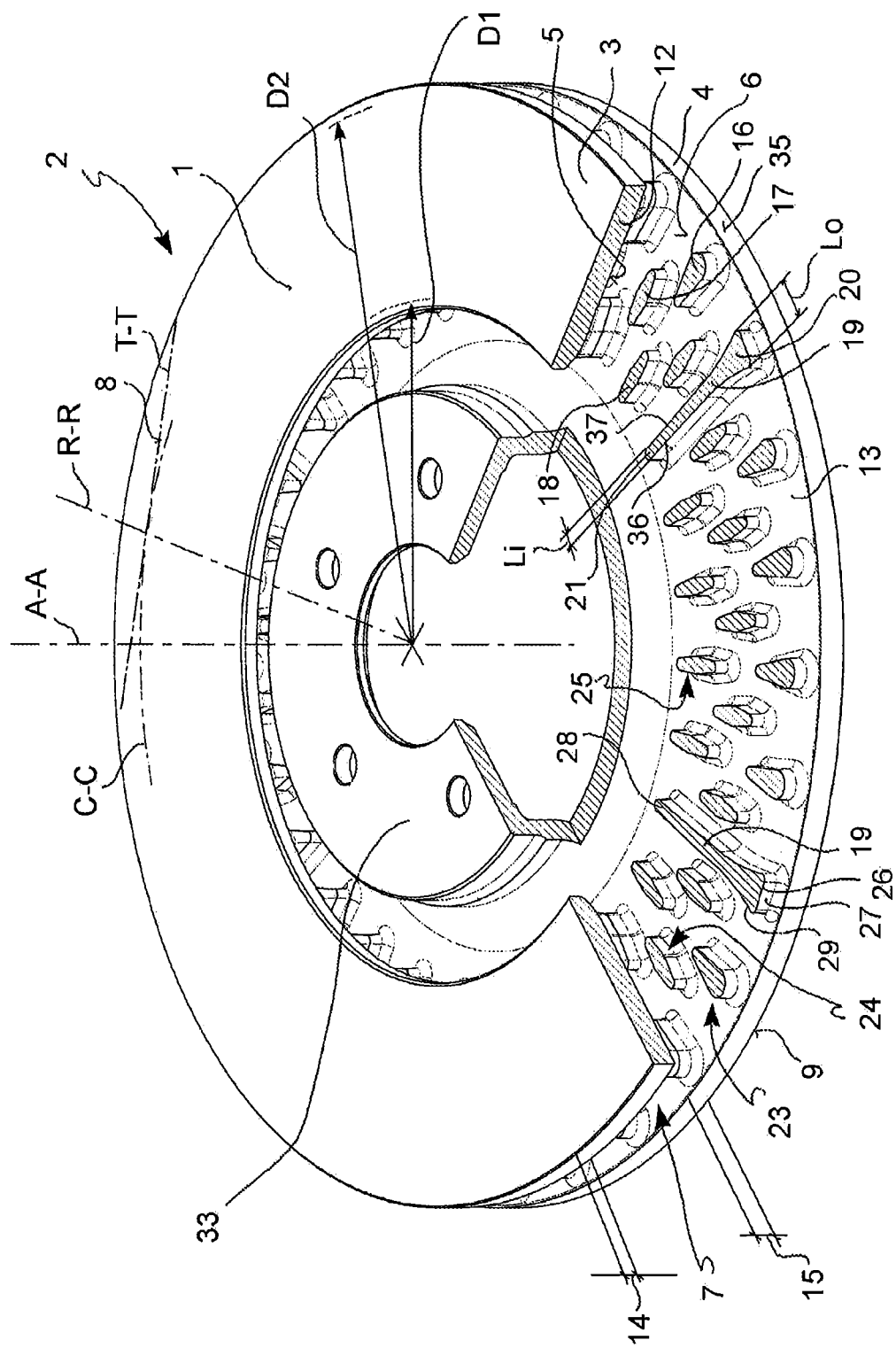
FIG. 1 is a partially sectioned axonometric view of a disc brake disc with a braking band according to the present invention.
Figure 2:
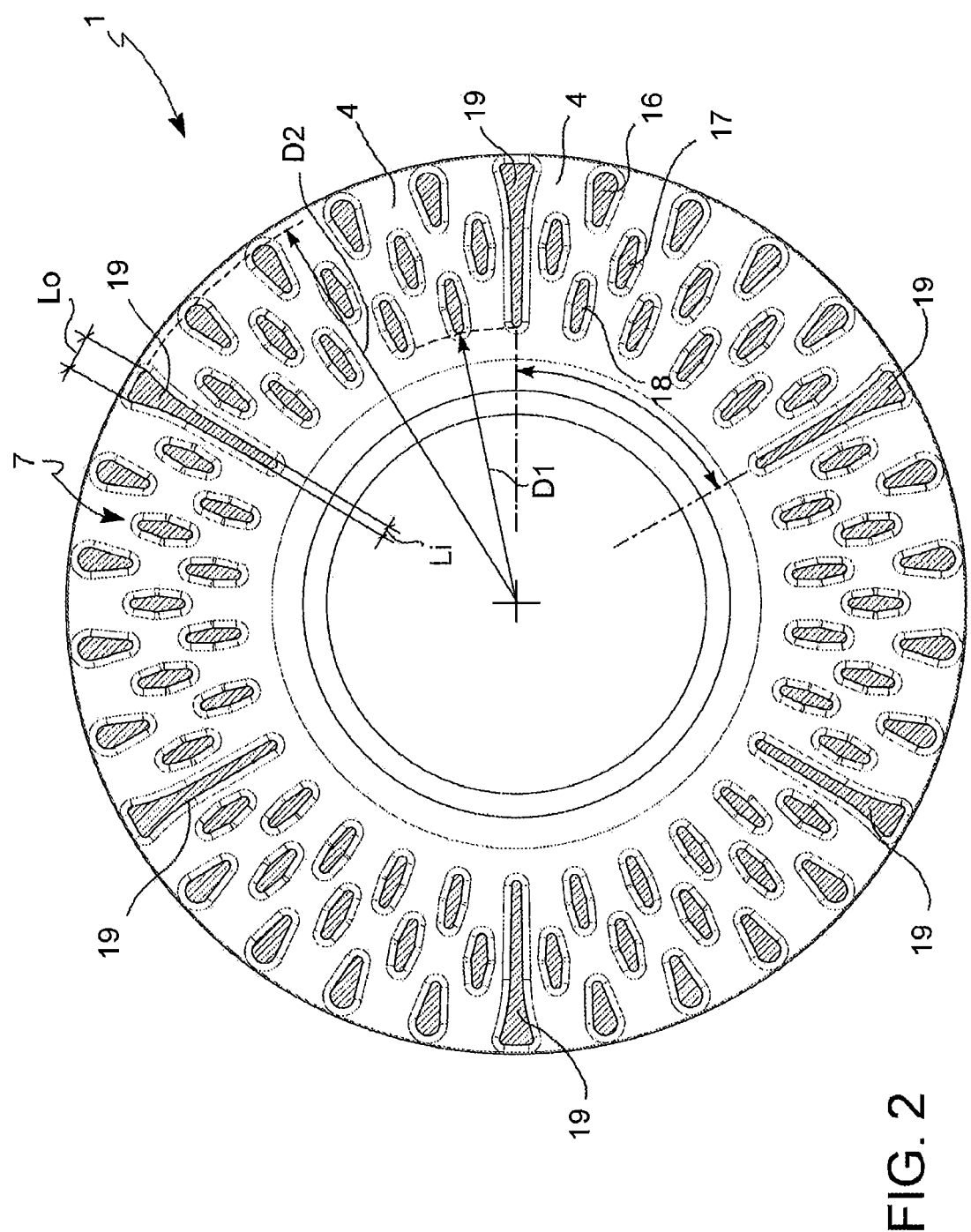
FIG. 2 shows a sectioned plan view taken along a medium plane of fluid flow through the gap of the braking band in FIG. 1.
Figure 3:
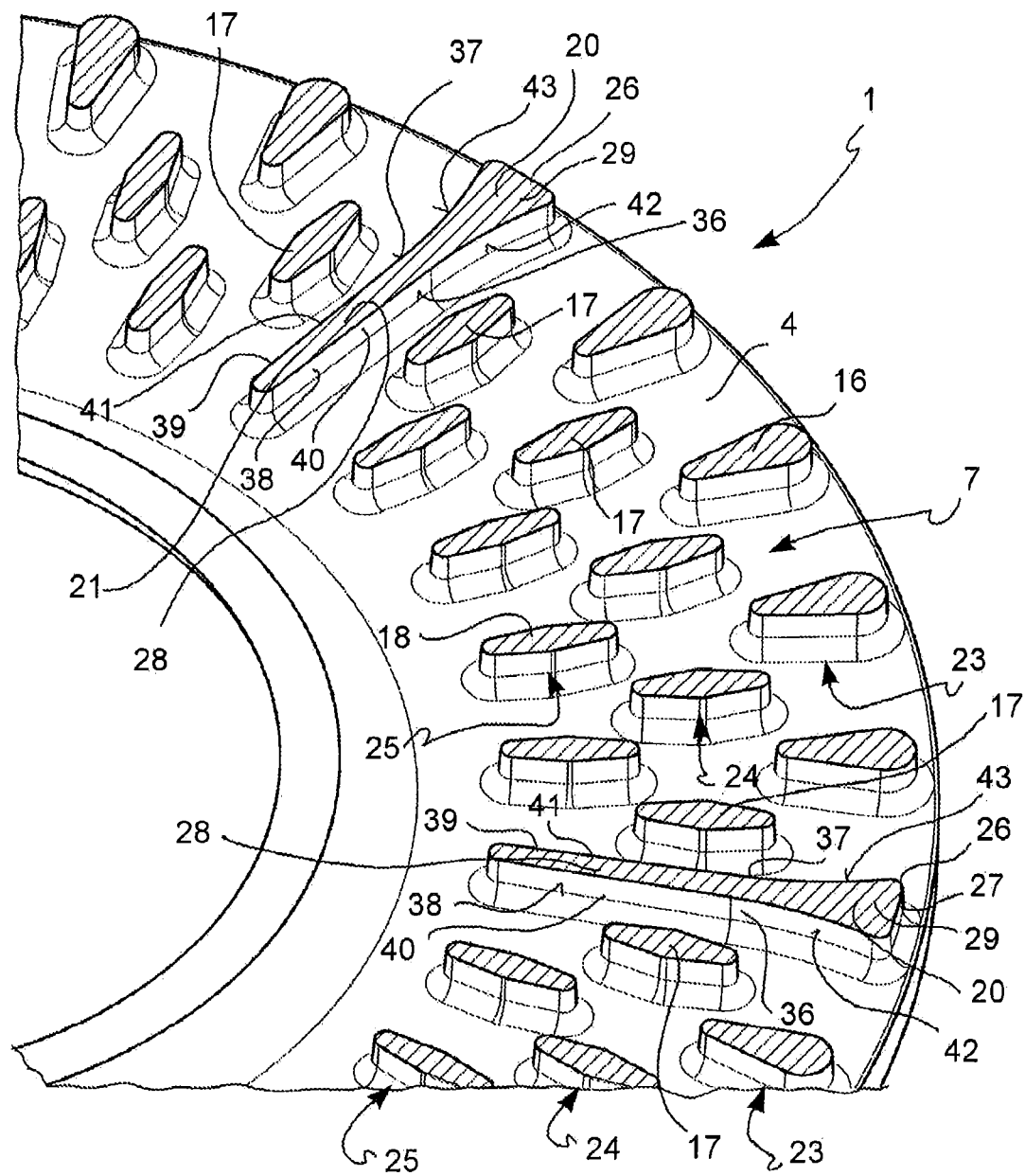
FIG. 3 is an axonometric view of an enlarged detail of the braking band section in FIG. 2.
Figure 4:
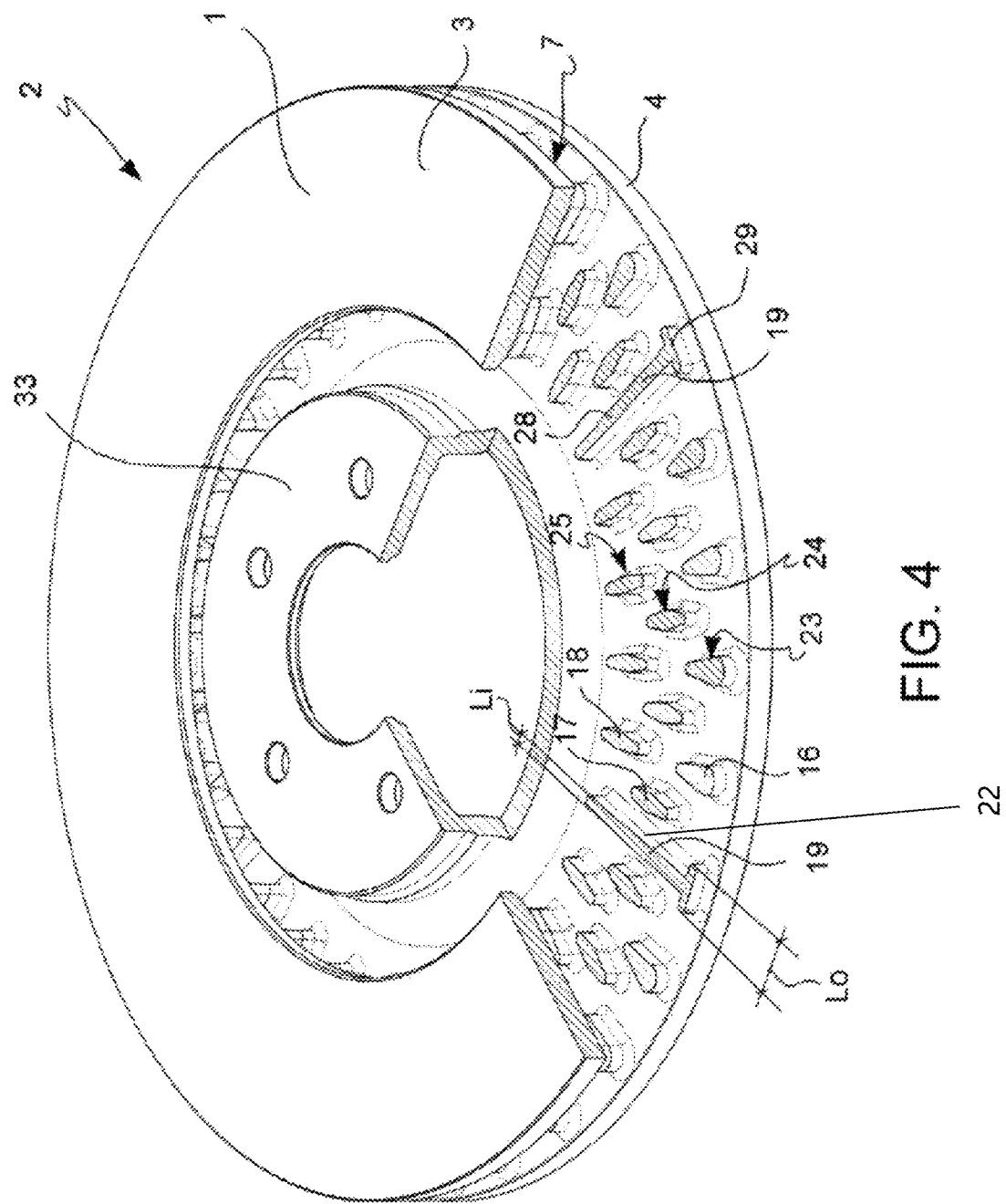
FIG. 4 is a partially sectioned axonometric view of a disc brake disc with a braking band according to a further embodiment of the present invention.
Figure 5:
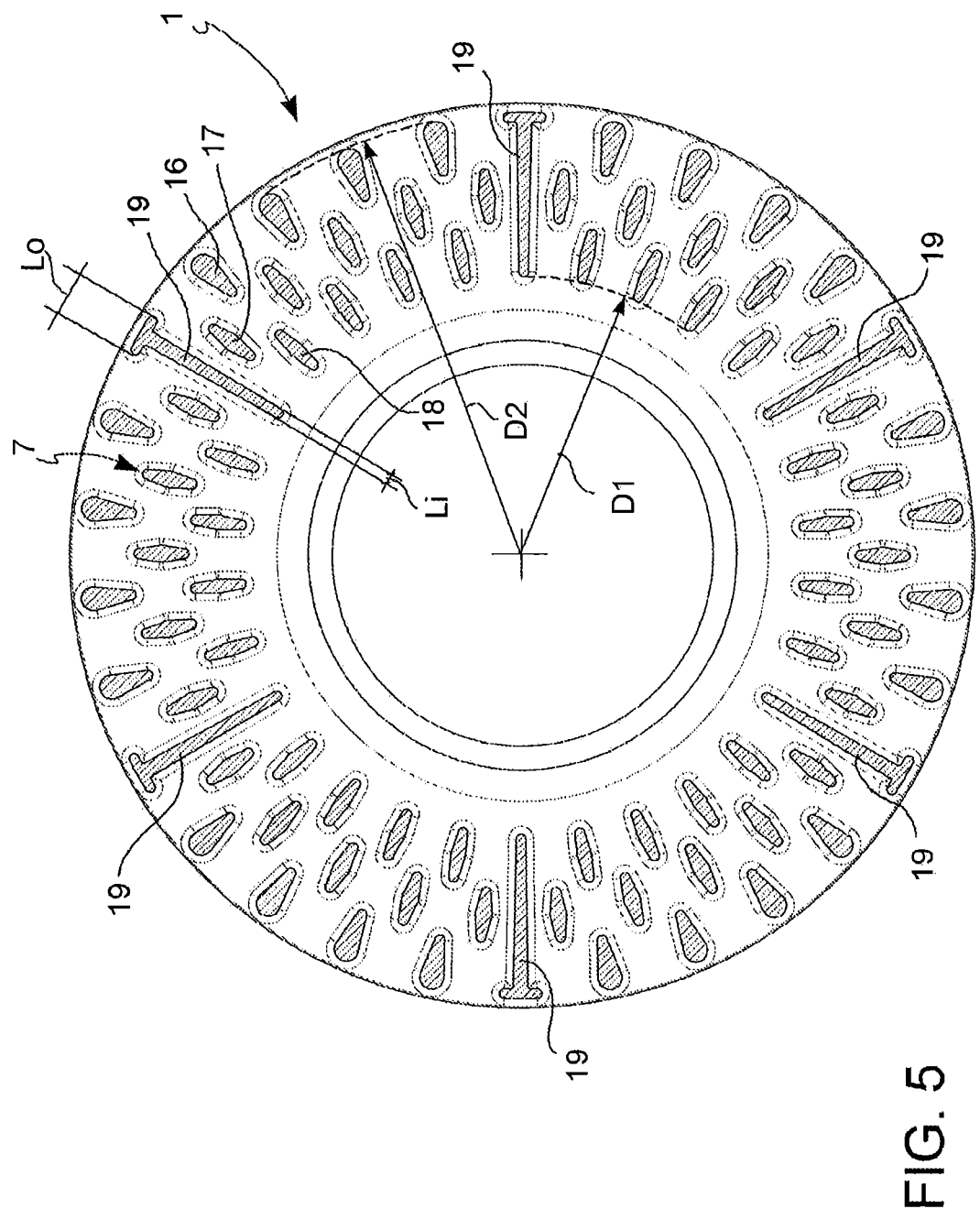
FIG. 5 shows a sectioned plan view taken along a medium plane of fluid flow through the gap of the braking band in FIG. 4.
Figure 6:
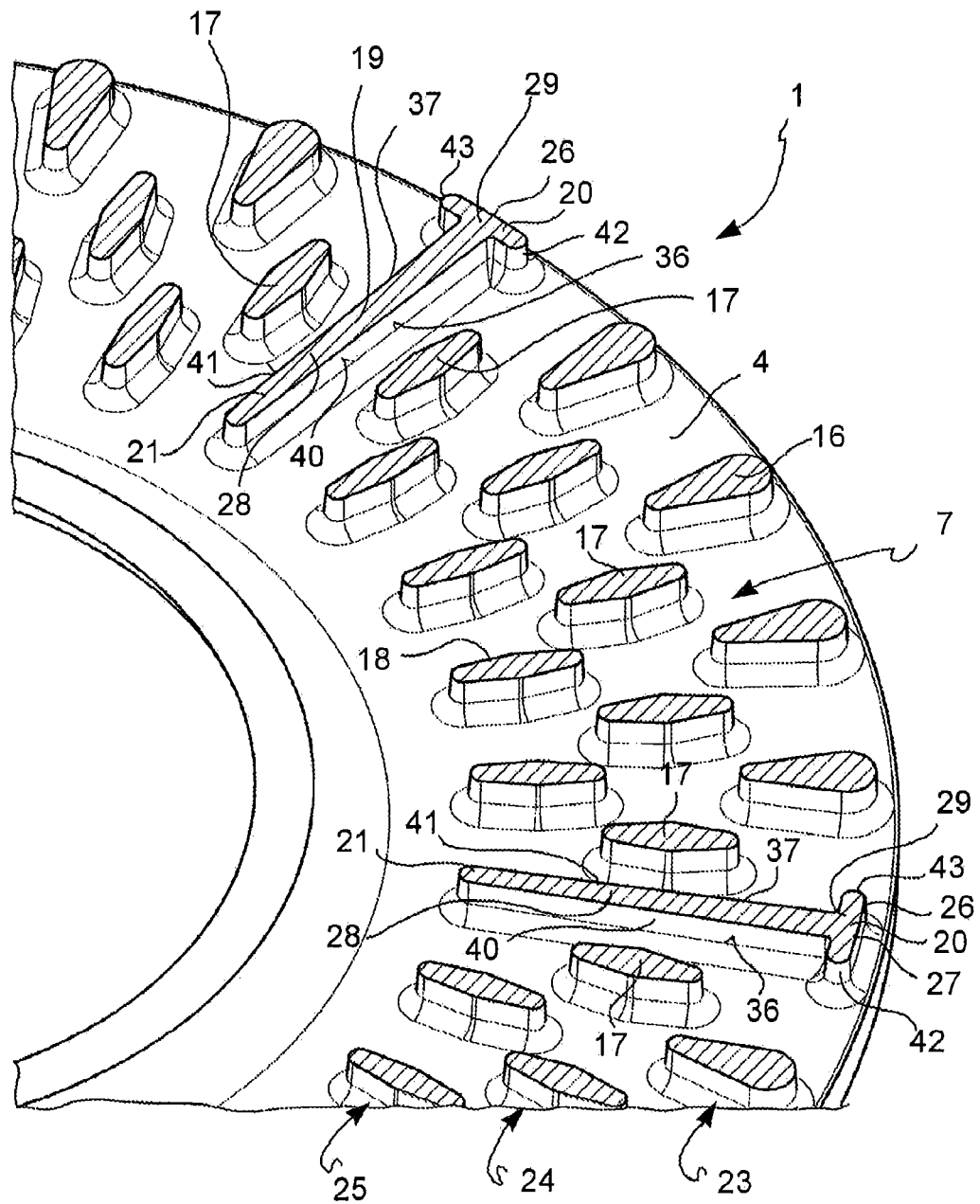
FIG. 6 is an axonometric view of an enlarged detail of the braking band section in FIG. 5.
Figure 7:
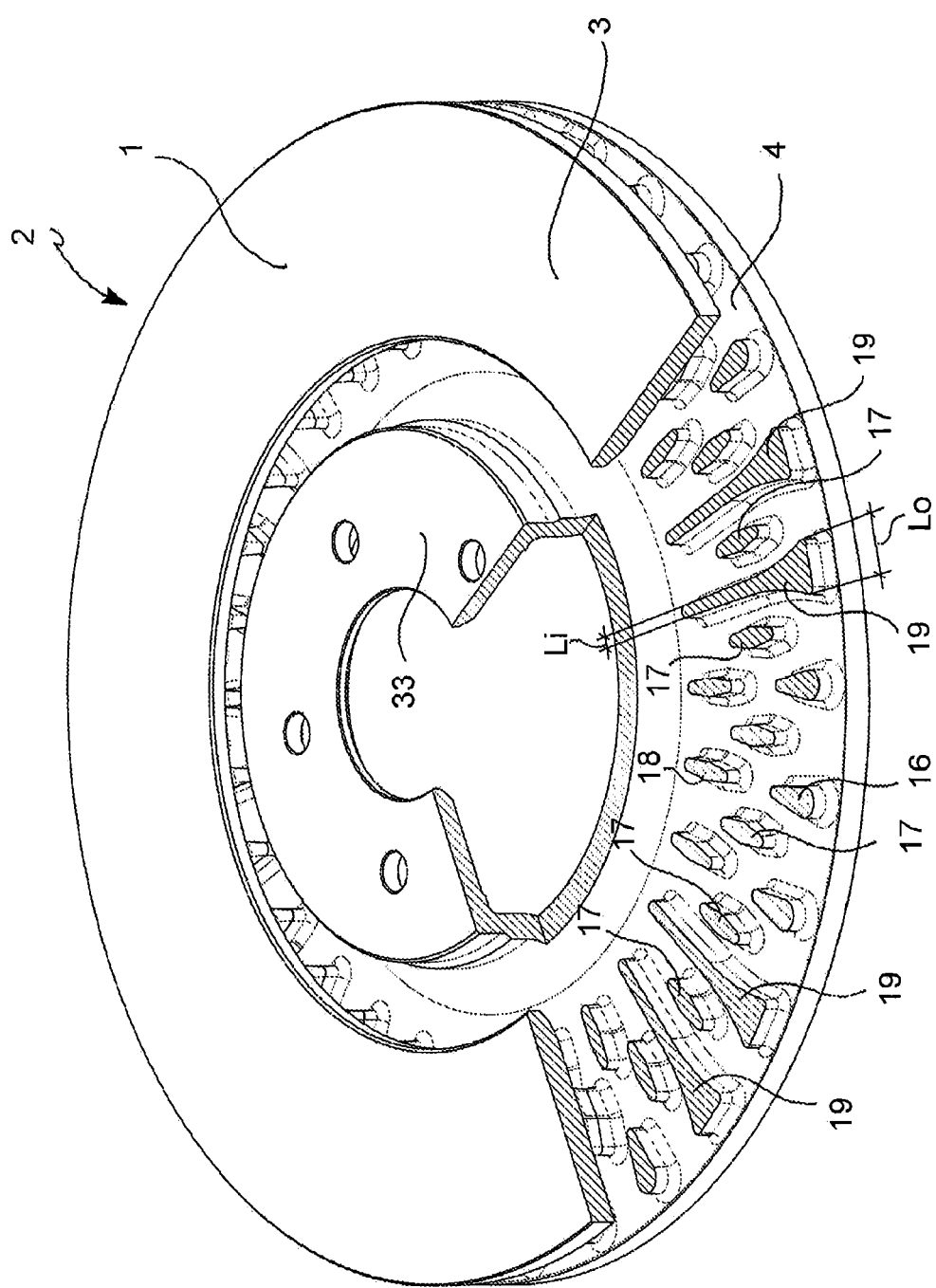
FIG. 7 is a partially sectioned axonometric view of a disc brake disc with a braking band according to a further embodiment of the present invention.
Figure 8:
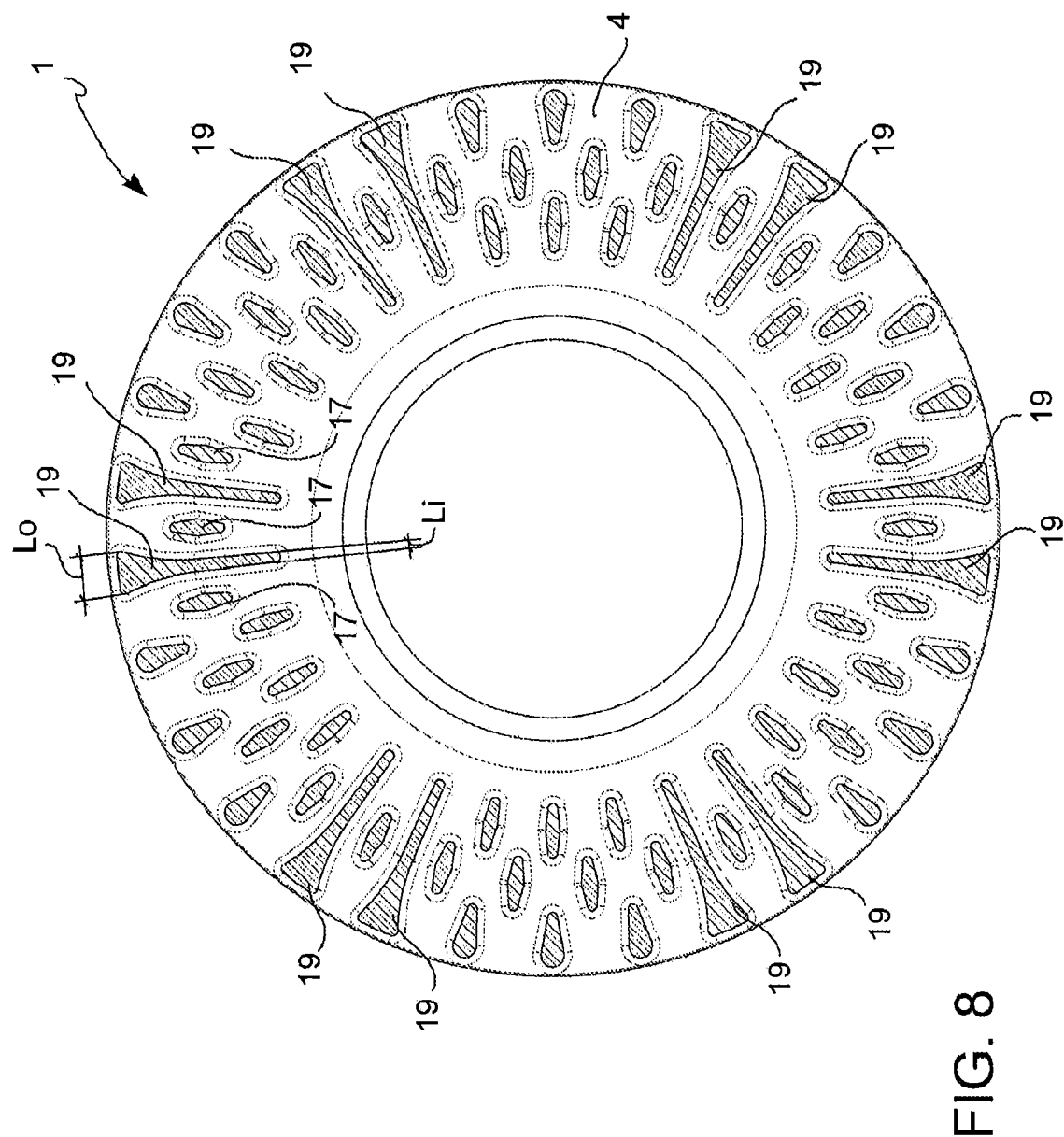
FIG. 8 shows a sectioned plan view taken along a medium plane of fluid flow through the gap of the braking band in FIG. 7.
Figure 9:
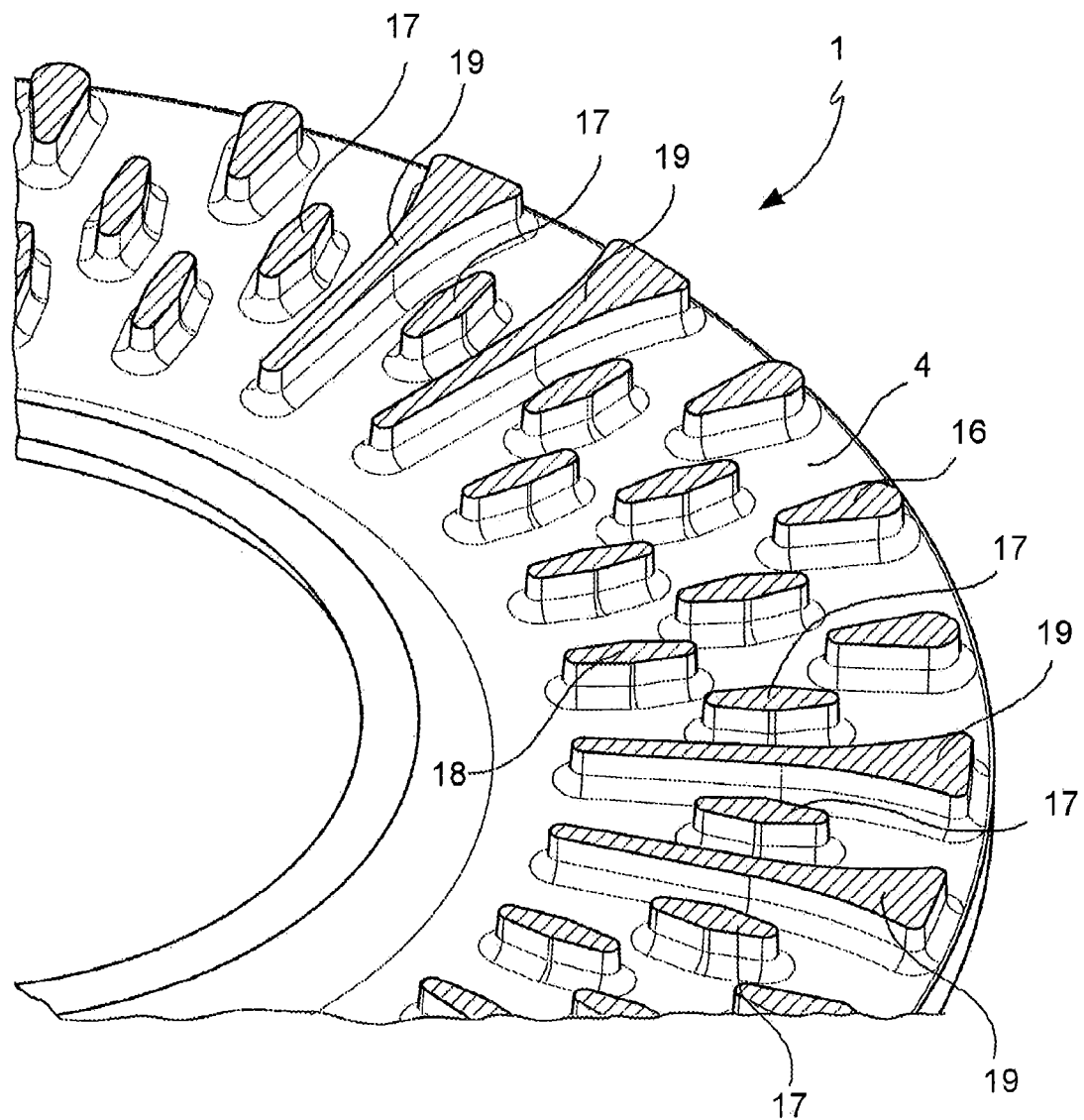
FIG. 9 is an axonometric view of an enlarged detail of the braking band section in FIG. 8.
Figure 10:
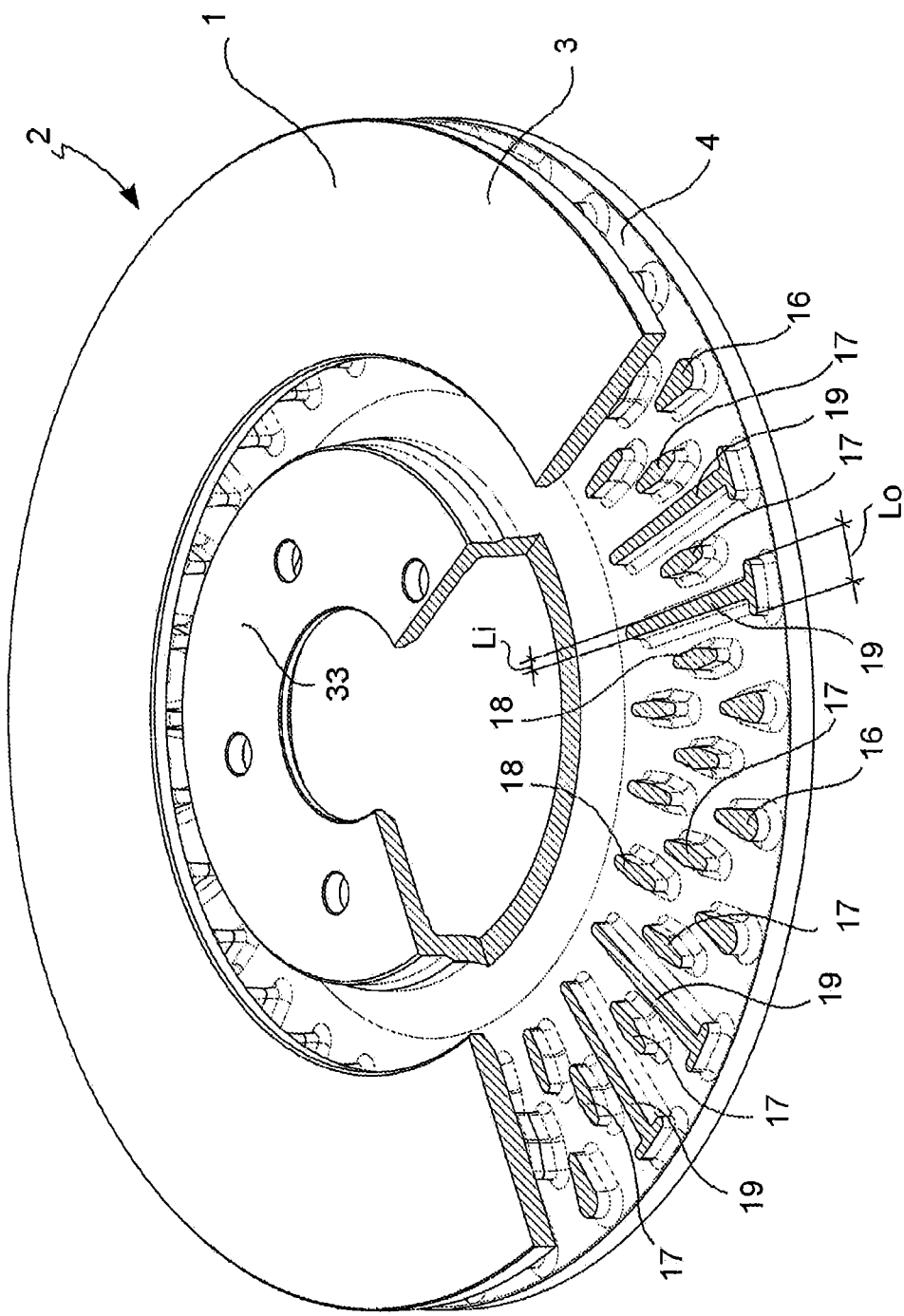
FIG. 10 is a partially sectioned axonometric view of a disc brake disc with a braking band according to a further embodiment of the present invention.
Figure 11:
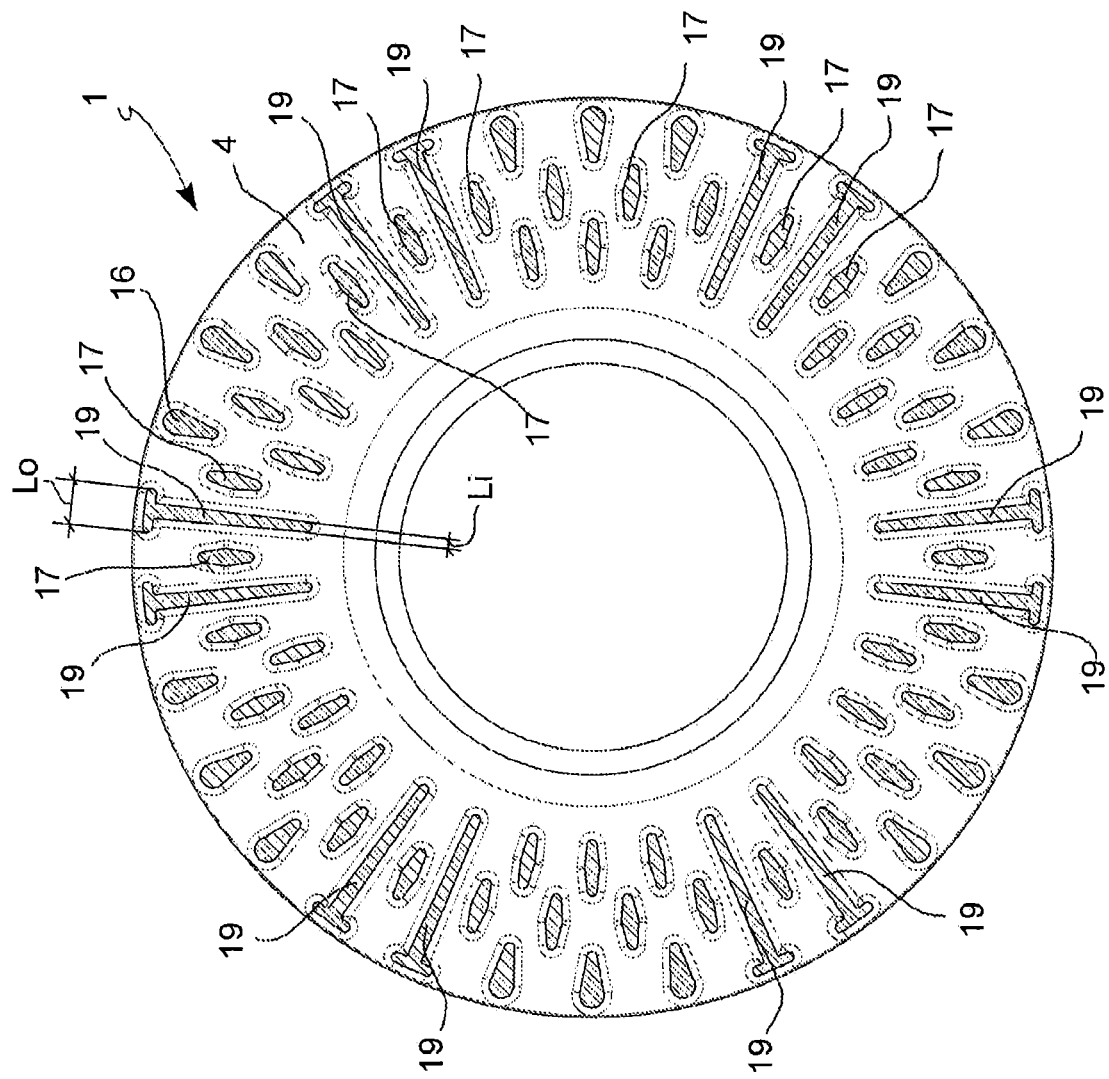
FIG. 11 shows a sectioned plan view taken along a medium plane of fluid flow through the gap of the braking band in FIG. 10.
Figure 12:
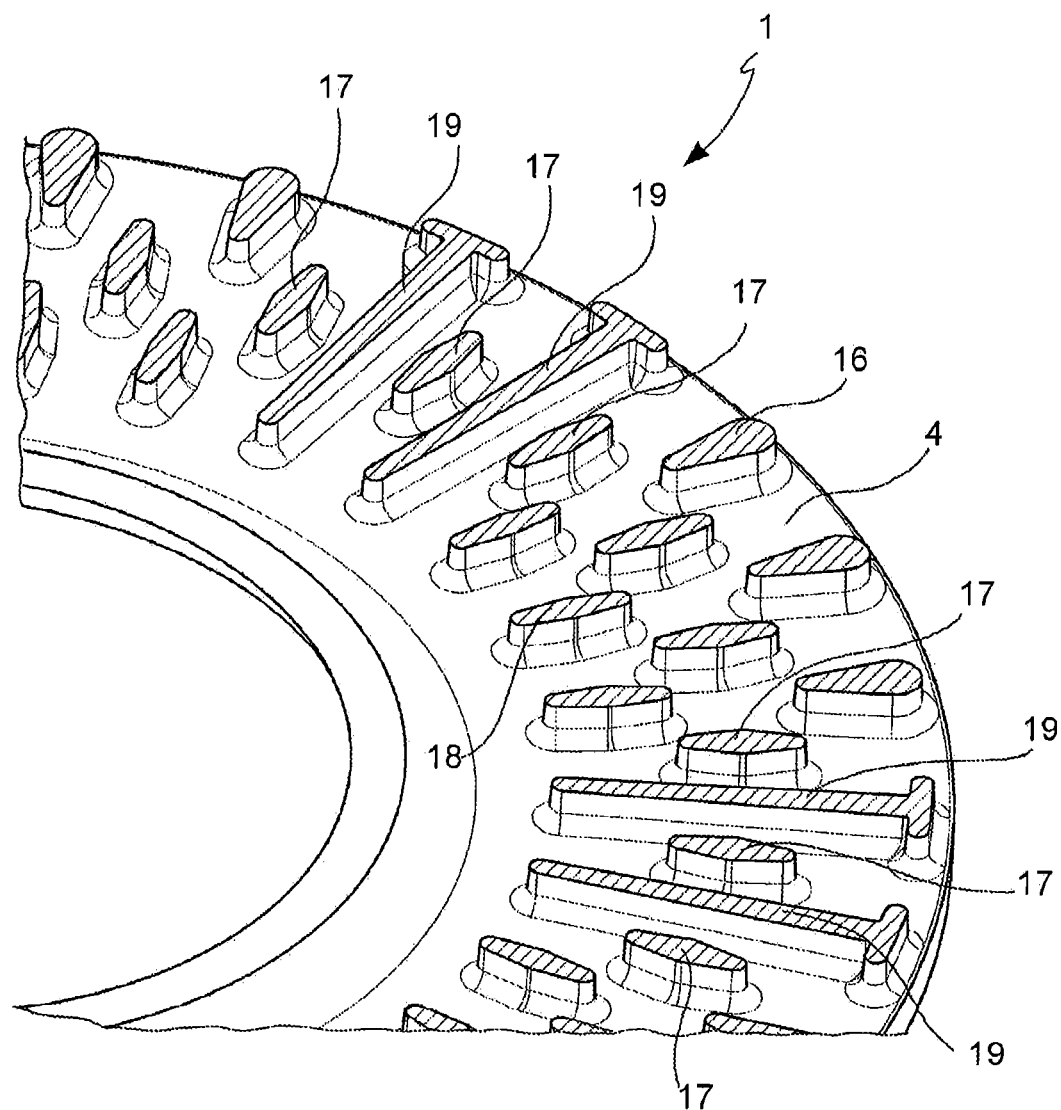
FIG. 12 is an axonometric view of an enlarged detail of the braking band section in FIG. 11.

According to a general embodiment, a braking band 1 of a disc for a disc brake 2 of the ventilated type is provided.

Said braking band 1 extends between an inner diameter D1, near a rotation axis X-X of the braking band 1, and an outer diameter D2, far from said rotation axis X-X. Said rotation axis defines an axial direction X-X.

Said braking band 1 defines a radial direction R-R, which is substantially orthogonal to said axial direction X-X, and a circumferential direction C-C which is orthogonal both to said axial direction X-X and to said radial direction R-R.

Said braking band 1 comprises two plates 3, 4 facing each other.

Said plates 3, 4 comprise inner surfaces 5, 6, either directly or indirectly facing each other and delimiting a gap 7 which defines a ventilation conduit for the braking band 1.

Said plates 3, 4 comprising outer surfaces 8, 9.

Said outer surfaces 8, 9 comprise opposite flat circumferential portions, which form braking surfaces 10, 11. In other words, portions of the outer surfaces 8, 9 cooperate with brake pads housed in a brake caliper to apply a braking action when sandwiched against the braking band 1. The portion of the outer surfaces 8, 9 which is brushed or concerned by the pads defines the braking surfaces 10, 11.

Said plates 3, 4 comprise a plate body 12, 13 having an extension in axial direction X-X or plate thickness 14, 15. In other words, when observed in an axial direction, each plate 3, 4 shows a plate thickness 14, 15 which is given by the thickness in the axial direction of the plate body 12 of the plate 3, 4.

Said plates 3, 4 are joined to each other by heat dissipation elements or connecting elements 16, 17, 18 of the plates 3, 4.

Said connecting elements 16, 17, 18 are shaped as columns and/or ribs, which project from one plate towards the opposite plate in the shape of connecting bridges of the plates 3, 4.

Advantageously, at least one of said connecting elements is a fin 19 which is in one piece and extends from near said inner diameter D1 to near said outer diameter D2.

Said fin 19 comprises a fin outer end portion 20 placed near said outer diameter D1.

Said fin outer end portion 20 of said fin 19 comprises a predetermined extension along the outer circumferential direction, i.e. an outer circumferential width Lo.

Said fin 19 comprises a fin inner end portion 21 placed near said inner diameter D1.

Said fin inner end portion 21 of said fin 19 comprises a predetermined extension along the inner circumferential direction, i.e. an inner circumferential width Li.

Advantageously, considering a section taken along a section plane comprising a radial R-R and circumferential C-C direction, section made by passing through a mean air flow point which runs through said gap, said outer circumferential width Lo is greater than said inner circumferential width Li.

According to an embodiment, said at least one fin 19 comprises an outer radial end 26. Said outer radial end 26 forms a base surface 27. Said base surface 27 comprises a circumferential extension having straight extension or extended arc extension parallel to the outer edge of the braking band 1 which defines said outer diameter D2.

According to an embodiment, said at least one fin 19 comprises a shank portion 28 which extends away from said inner diameter D1. Said shank portion 28 is delimited by two mutually opposite sides 38, 39; wherein at least one of said shank sides 38, 39 is substantially directed along said radial direction R-R.

According to an embodiment, said at least one fin 19 comprises a shank portion 28 which extends away from said inner diameter D1. Said shank portion 28 is delimited by two mutually opposite sides 38, 39; wherein both said shank sides 38, 39 are substantially directed along said radial direction R-R.

According to an embodiment, said at least one fin 19 comprises a shank portion 28 which extends away from said inner diameter D1. Said shank portion 28 is delimited by two mutually opposite sides 38, 39; wherein at least one of said shank sides 38, 39 comprises at least one shank straight stretch 40.

According to an embodiment, said at least one fin 19 comprises a shank portion 28 which extends away from said inner diameter D1. Said shank portion 28 is delimited by two mutually opposite sides 38, 39; wherein both of said shank sides 38, 39 comprise mutually opposite shank straight stretches 40, 41.

According to an embodiment, said at least one fin 19 comprises an outer radial portion 29 arranged near said outer radial end 20 of said fin 19. Said at least one fin 19 comprises a shank portion 28 arranged near said inner radial end 21 of said fin 19.

According to an embodiment, in a section taken along a section plane comprising a radial R-R and circumferential C-C direction, section made by passing through a mean air flow point which runs through said gap, a section edge or perimeter of said fin from said outer radial portion 29 is connected to said shank portion 28.

According to an embodiment, said outer radial portion 29 is tapered passing near said outer diameter D2 and going towards said inner diameter D1.

According to an embodiment, said shank portion 28 comprises a width, i.e. an extension evaluated in a circumferential direction, substantially constant along its entire extension which juts predominantly in radial direction R-R.

Advantageously, said outer radial portion 29 is tapered and connected to said shank portion 28.

By virtue of the provision of a tapered radial outer portion connected to said shank portion, it is possible to significantly improve the ventilation and therefore the cooling of the disc. Indeed, the tapered radial portion of the tapered tern conveys the cooling fluid flow through the disc, thus improving the cooling efficiency of the disc itself. At the same time, the connection to the shank portion allows to have a fin which, without discontinuity, stiffens and strengthens the entire radial extension of the ventilated braking band of the disc, thereby improving the structural and dynamic performance of the disc itself.

According to an embodiment, said outer radial portion 29 is delimited by two mutually opposite outer radial portion sides 42, 43; said outer radial portion sides 42, 43 are arched and connect to said shank portion 28.

According to an embodiment, said at least one fin 19 comprises fin connectors 22 which connect said fin 19 to said inner surfaces 5, 6 of said plate 3, 4.

According to an embodiment, said at least one fin 19 comprises an outer radial portion 29 arranged near said outer radial end 20 of said fin 19. Said at least one fin 19 comprises a shank portion 28 arranged near said inner radial end 21 of said fin 19.

According to an embodiment, in a section according to a section plane comprising a radial R-R and circumferential C-C direction, section made by passing through a mean air flow point which runs through said gap, said outer radial portion 29 comprises a substantially rectangular or oval shape having a prevalent extension in the circumferential C-C or tangential T-T direction.

According to an embodiment, said shank portion 28 comprises a width in circumferential direction C-C, substantially constant along all its prevalent extension in radial direction R-R.

According to an embodiment, said shank portion 28 is connected to said outer radial portion 29 substantially at half of the circumferential or tangential extension of the outer radial portion 29.

According to an embodiment, wherein said braking band 1 comprises at least one connecting element 16, 17, 18 which connects said plates 3,4 and comprises an extension in radial direction R-R lower than the band height, i.e. at the radial distance between said inner diameter D1 and said outer diameter D2; said connecting element being named pin 16, 17, 18.

According to an embodiment, at least one pin 17 is arranged directly facing at least one fin 19.

According to an embodiment, said braking band 19 comprises at least two pins 16, 17, 18. Said at least two pins 17 are arranged directly facing said at least one fin 19 from opposite sides 36, 37 thereof.

According to an embodiment, wherein said braking band 1 comprises at least one connecting element 16, 17, 18 which connects said plates 3,4 and comprises an extension in radial direction R-R lower than the band height, i.e. at the radial distance between said inner diameter D1 and said outer diameter D2; said connecting element being named pin 16, 17, 18.

According to an embodiment, said at least one pin is a plurality of pins 16, 17, 18.

According to an embodiment, said plurality of pins 16, 17, is arranged according to three ranks, an outer rank 23, an intermediate rank 24, and an inner rank 25.

According to an embodiment, said plurality of pins 16, 17, is arranged according to three ranks, an outer rank 23, an intermediate rank 24, and an inner rank 25 and at least one pin 17 of the intermediate rank 24 faces at least one side 37, 38 of said fin 19.

According to an embodiment, at least one pin 16 comprises a drop-shaped section according to a section plane comprising a radial R-R and circumferential direction C-C, section made by passing through a mean air flow point which runs through said gap, thus defining a drop-shaped pin 16.

According to an embodiment, at least one pin 16 is tapered towards said inner diameter D1.

According to an embodiment, at least one pin 17, 18 comprise in a rhombus-shaped section according to a section plane comprising a radial R-R and circumferential direction C-C, section made by passing through a mean air flow point which runs through said gap, thus defining a rhombus-shaped pin 17, 18.

According to an embodiment, said plurality of pins 16, 17, is arranged according to three ranks, an outer rank 23, an intermediate rank 24, and an inner rank 25.

According to an embodiment, said outer rank 23 comprises at least one drop-shaped pin 16 or comprises only drop-shaped pins 16.

According to an embodiment, said intermediate rank 24 comprises at least one rhombus-shaped pin 17 or comprises only rhombus-shaped pins 17.

According to an embodiment, said inner rank 25 comprises at least one rhombus-shaped pin 18 or comprises only rhombus-shaped pins 18.

According to an embodiment, said plurality of pins 16, 17, is arranged according to three ranks, an outer rank 23, an intermediate rank 24, and an inner rank 25. All the pins 16, 17, 18 are arranged in a quincunx.

According to an embodiment, said braking band 1 comprises a plurality of pins 19.

According to an embodiment, said plurality of fins 19 is arranged circumferentially in a uniform manner along said gap 7 providing one fin 19 every 60 DEG.

According to an embodiment, said fins 19 are six fins 19 distributed circumferentially in a uniform manner along said gap 7.

According to an embodiment, said fins 19 are arranged in said gap 7 in pairs of fins.

According to an embodiment, said fins 19 are arranged in said gap 7 in pairs of fins distributed circumferentially in a uniform manner along said gap 7.

According to an embodiment, said fins 19 are arranged in said gap 7 in pairs of fins in which at least one pin 17 is provided between said fins 19 of said pair of fins.

According to an embodiment, said fins 19 are arranged in said gap 7 in pairs of fins in which at least one pin 17 is provided between said fins 19 of said pair of fins and said pairs of fins with at least one interposed pin are distributed circumferentially in a uniform manner along said gap 7.

The present invention further relates to a disc brake disc comprising a braking band 1 as defined by any one of the embodiments described above and a bell 33 associated with said braking band 1 and adapted to connect to a wheel hub of a vehicle.

The present invention further relates to a vehicle comprising a disc brake disc 2 as defined above.

An embodiment of the present invention is described by way of non-limiting example below.

According to an embodiment, a braking band 1 has an outer diameter D2 of 380 mm, an inner diameter of 228 mm, and a thickness of 34 mm.

The two plates 3, 4 are connected to each other by connecting elements 16, 17, 18 in the form of columns arranged in three rows or ranks 23, 24, 25, which are concentric and said connecting elements 16, 17, 18 are arranged in a quincunx arrangement.

Fins 19 extending for the entire height of the gap 7 are present every 60 DEG.

On the outer rank 24, the connecting elements have a shape evaluated on a mean flow plane which runs through the drop-shaped gap 7, with tapering extension directed in the radial direction R-R and facing the rotation axis X-X.

On the intermediate rank 25 and inner rank 23, the connecting elements 17, 18 have a shape, evaluated in a mean flow plane which runs through the rhomboidal gap 7.

Each rank counts 47 connecting elements 16 or 17 or 18.

The fins have dimensions $L_o$=14.35 mm, Li=4 mm and radial length of 69 mm.

The modal analysis performed in a frequency range from 20 to 10,000 Hz (with material having a Young modulus of 123,700 MPa a Poisson ratio of 0.250 and a density of 7.205 kg/dm$^3$ presented the following values of interest compared with the solution described in EP 2 715 179 B1 by Applicant:

|  | Mode K(0; 3) |
|---|---|
| 1 projection band disc frequency [Hz] according to EP 2 715179 B1 | 1692 |
| 2 projection band disc frequency [Hz] according to the present invention amplitude reduction and amplitude reduction | 1662 and 1744 separation of the single high sound peak into 2 lower ones |

LIST OF REFERENCES

1 braking band
2 disc brake disc
3 plate
4 plate
5 inner surface
6 inner surface
7 gap
8 outer surface
9 outer surface
10 braking surface
11 braking surface
12 plate body
13 plate body
14 plate thickness
15 plate thickness
16 outer pin connecting elements or outer rank
17 intermediate pin connecting elements or intermediate rank
18 inner pin connecting elements or inner rank
19 fin-shaped connecting elements
20 fin outer end portion
21 fin inner end portion
23 outer pin rank
24 intermediate pin rank
25 inner pin rank
26 fin outer radial end
27 outer radial end base surface
28 fin shank portion
29 fin outer radial portion
33 bell
35 outer band edge
36 fin side
37 opposite fin side
38 shank side
39 opposite shank side
40 shank rectilinear stretch
41 shank rectilinear stretch
42 outer radial portion side
43 outer radial portion opposite side
A-A braking band or brake disc rotation axis
X-X rotation axis or axial direction
R-R radial direction
C-C tangential direction
D1 inner band diameter
D2 outer band diameter
Lo fin outer circumferential width
Li fin inner circumferential width

The invention claimed is:

1. A braking band of a disc for disc brake, comprising:
said braking band extending between an inner diameter, near a rotation axis of the braking band, and an outer diameter, far from said rotation axis, said rotation axis defining an axial direction;
said braking band defining a radial direction, substantially orthogonal to said axial direction, and a circumferential direction, orthogonal to said axial direction and to said radial direction, and a tangential direction punctually orthogonal to said axial direction and a radial direction;
said braking band comprising two mutually facing plates;
said plates comprising inner surfaces, either directly or indirectly facing and delimiting a gap;
said plates being joined to each other by heat dissipating and connecting elements, also named connecting elements;
said connecting elements project from one of said plates towards the opposite plate, thereby forming bridges which connect the plates to each other;

wherein
at least one of said connecting elements is at least one fin which is in a single piece and extends from near said inner diameter to near said outer diameter; and wherein said at least one fin comprises a fin outer end portion located near said outer diameter, the fin outer end portion of said at least one fin comprises a predetermined extension along the outer circumferential direction comprising an outer circumferential width;

said at least one fin comprises a fin inner end portion located near said inner diameter;

said fin inner end portion of said at least one fin comprises a predetermined extension along the inner circumferential direction comprising an inner circumferential width;

wherein considering a section taken along a section plane comprising a radial and circumferential direction, section made by passing through a mean air flow point which runs through said gap, said outer circumferential width is greater than said inner circumferential width; and wherein said at least one fin comprises a shank portion which extends away from said inner diameter, said shank portion is delimited by two mutually opposite sides, wherein at least one of said shank sides is substantially directed along said radial direction; and wherein said at least one fin comprises an outer radial portion arranged near said outer radial end of said at least one fin;

wherein said outer radial portion is tapered and connected to said shank portion, wherein connecting elements bound both sides of said at least one fin along the entire radial length of said at least one fin, wherein said bounding connecting elements are rhombus-shaped according to a section plane comprising a radial and circumferential direction, said section made by passing through said mean air flow point which runs through said gap.

2. The braking band according to claim 1, wherein said fin outer end portion forms a base surface, said base surface comprises a circumferential extension having straight extension or extended arc extension parallel to the outer edge of the braking band which defines said outer diameter.

3. The braking band according to claim 1, wherein at least one of the following alternatives is provided:
said at least one fin comprises a shank portion which extends away from said inner diameter, said shank portion is delimited by two mutually opposite sides, wherein at least one of said shank sides comprises at least one shank straight stretch; or
said at least one fin comprises a shank portion which extends away from said inner diameter, said shank portion is delimited by two mutually opposite sides, wherein both of said shank sides comprise mutually opposite shank straight stretches.

4. The braking band according to claim 1, wherein
said at least one fin comprises said shank portion arranged near said inner radial end of said at least one fin; and
at least one of the following alternatives is provided:
in a section taken along a section plane comprising a radial and circumferential direction, section made by passing through said mean air flow point which runs through said gap, a section edge or perimeter of said at least one fin from said outer radial portion is connected to said shank portion;

or
said outer radial portion is tapered passing near said outer diameter and going towards said inner diameter;
or
said shank portion comprises a width, comprising an extension evaluated in circumferential direction, substantially constant along its entire extension which juts predominantly in radial direction;
or
said outer radial portion is delimited by two mutually opposite outer radial portion sides; said outer radial portion sides are arched and connect to said shank portion.

5. The braking band according to claim 1, wherein said at least one fin comprises fin connectors which connect said at least one fin to said inner surfaces of one of said plates.

6. The braking band according to claim 1 wherein:
said at least one fin comprises said shank portion arranged near said inner radial end of said at least one fin;
wherein a section according to a section plane comprising a radial and circumferential direction, section made by passing through said mean air flow point which runs through said gap,
said outer radial portion comprises a substantially rectangular or oval shape having a prevalent extension in the circumferential or tangential direction;
and/or wherein
said shank portion comprises a width in circumferential direction, substantially constant along all its prevalent extension in radial direction;
and/or wherein
said shank portion is connected to said outer radial portion substantially at half of the circumferential or tangential extension of the outer radial portion.

7. The braking band according to claim 1
wherein said extension in the radial direction lower than the band height comprising at the radial distance between said inner diameter and said outer diameter; said connecting element being named a pin;
wherein at least one pin is provided;
or wherein
said braking band comprises at least two pins.

8. The braking band according to claim 1, wherein said connecting elements comprise an extension in the radial direction lower than the band height comprising at the radial distance between said inner diameter and said outer diameter, said connecting element being named a pin;
wherein said at least one pin is a plurality of pins;
at least one of the following alternatives is provided:
said plurality of pins is arranged according to three ranks, an outer rank, an intermediate rank and an inner rank;
or
said plurality of pins is arranged according to three ranks, an outer rank, an intermediate rank and an inner rank and at least one pin of the intermediate rank faces at least one side of said at least one fin;
or
at least one pin comprises a drop-shaped section according to a section plane comprising a radial and circumferential direction, section made by passing through said mean air flow point which runs through said gap, thus defining a drop-shaped pin;
or
at least one pin is tapered towards said inner diameter;
or
said plurality of pins is arranged according to three ranks, an outer rank, an intermediate rank and an inner rank;

and wherein the outer rank comprises at least one drop-shaped pin, or comprises only drop-shaped pins;

and wherein said intermediate rank comprises at least one rhombus-shaped pin, or comprises only rhombus-shaped pins;

and wherein said inner rank comprises at least one rhombus-shaped pin, or comprises only rhombus-shaped pins;

or said plurality of pins is arranged according to three ranks, an outer rank, an intermediate rank and an inner rank;

and wherein all the pins are arranged in a quincunx.

9. The braking band according to claim 1, wherein said at least one fin comprises a plurality of fins;

at least one of the following alternatives is provided:

wherein said plurality of fins is arranged circumferentially in uniform manner along said gap providing one fin every 60 DEG;

or said fins are six fins distributed circumferentially in uniform manner along said gap;

or said fins are arranged in said gap in pairs of fins;

or said fins are arranged in said gap in pairs of fins distributed circumferentially in a uniform manner along said gap;

or said fins are arranged in said gap in pairs of fins in which at least one pin is provided between said fins of said pair of fins;

or said fins are arranged in said gap in pairs of fins in which at least one pin is provided between said fins of said pair of fins and said pairs of fins with at least one interposed pin are distributed circumferentially in uniform manner along said gap.

10. A disc brake disc comprising the braking band as defined by in claim 1 and a bell associated with said braking band and adapted to connect to a wheel hub of a vehicle.

11. A vehicle comprising a disc brake disc according to claim 10.

12. The braking band according to claim 1, wherein the connecting elements directly face both sides of said at least one fin with no intervening structures between the connecting elements and said at least one fin.

* * * * *